(12) United States Patent
Benkley, III (10) Patent No.: US 7,463,756 B2
(45) Date of Patent: Dec. 9, 2008

(54) FINGER POSITION SENSING METHODS AND APPARATUS

(75) Inventor: Fred G. Benkley, III, Andover, MA (US)

(73) Assignee: Validity Sensors, Inc., San Jose, CA (US)

( * ) Notice: Subject to any disclaimer, the term of this patent is extended or adjusted under 35 U.S.C. 154(b) by 486 days.

(21) Appl. No.: 11/107,682

(22) Filed: Apr. 15, 2005

(65) Prior Publication Data

US 2005/0244038 A1 Nov. 3, 2005

Related U.S. Application Data

(60) Provisional application No. 60/563,139, filed on Apr. 16, 2004.

(51) Int. Cl.
*G06K 9/00* (2006.01)
(52) U.S. Cl. .................................. 382/126; 345/174
(58) Field of Classification Search .................. 382/126
See application file for complete search history.

(56) References Cited

U.S. PATENT DOCUMENTS

| | | | |
|---|---|---|---|
| 4,353,056 A | 10/1982 | Tsikos | |
| 4,525,859 A | 6/1985 | Bowles et al. | |
| 4,550,221 A | 10/1985 | Mabusth | |
| 5,076,566 A | 12/1991 | Kriegel | |
| 5,109,427 A | 4/1992 | Yang | |
| 5,305,017 A * | 4/1994 | Gerpheide | 345/174 |
| 5,325,442 A | 6/1994 | Knapp | |
| 5,420,936 A | 5/1995 | Fitzpatrick et al. | |
| 5,627,316 A | 5/1997 | De Winter et al. | |
| 5,818,956 A | 10/1998 | Tuli | |
| 5,852,670 A | 12/1998 | Setlak et al. | |
| 5,940,526 A | 8/1999 | Setlak et al. | |
| 6,002,815 A | 12/1999 | Immega et al. | |
| 6,016,355 A | 1/2000 | Dickinson et al. | |
| 6,259,108 B1 | 7/2001 | Antonelli et al. | |
| 6,289,114 B1 | 9/2001 | Mainguel | |
| 6,317,508 B1 | 11/2001 | Kramer et al. | |
| 6,320,394 B1 | 11/2001 | Tartagni | |

(Continued)

FOREIGN PATENT DOCUMENTS

DE 2213813 10/1973

(Continued)

OTHER PUBLICATIONS

Search Report Mailed Sep. 26, 2002 for International Application No. PCT/US2001/46525.

(Continued)

*Primary Examiner*—Samir A Ahmed
*Assistant Examiner*—Aklilu K Woldemariam
(74) *Attorney, Agent, or Firm*—Stevens Law Group (57) ABSTRACT

A finger position sensing apparatus, typically used in a fingerprint sensing system, includes a position pickup plate disposed generally orthogonally with respect to an expected direction of movement of a finger and a plurality of position drive plates having different spacings from the position pickup plate to define plurality of position sensor gaps between respective position drive plates and the position pickup plate. The position drive plates are dimensioned and spaced from the position pickup plate to sense the bulk of a finger rather than fingerprint features.

1 Claim, 8 Drawing Sheets

U.S. PATENT DOCUMENTS

| | | | |
|---|---|---|---|
| 6,333,989 | B1 | 12/2001 | Borza |
| 6,346,739 | B1 | 2/2002 | Lepert et al. |
| 6,347,040 | B1 | 2/2002 | Fries et al. |
| 6,362,633 | B1 | 3/2002 | Tartagni |
| 6,400,836 | B2 | 6/2002 | Senior |
| 6,408,087 | B1 | 6/2002 | Kramer |
| 6,580,816 | B2 | 6/2003 | Kramer et al. |
| 6,643,389 | B1 | 11/2003 | Raynal et al. |
| 6,672,174 | B2 | 1/2004 | Deconde et al. |
| 6,785,407 | B1 | 8/2004 | Tschudi et al. |
| 2001/0043728 | A1 | 11/2001 | Kramer et al. |
| 2002/0067845 | A1 | 6/2002 | Griffis |
| 2003/0035570 | A1 | 2/2003 | Benkley, III |
| 2003/0161512 | A1 | 8/2003 | Mathiassen et al. |
| 2003/0224553 | A1 | 12/2003 | Manansala |
| 2004/0012773 | A1 | 1/2004 | Puttkammer |
| 2005/0100196 | A1 | 5/2005 | Scott et al. |

FOREIGN PATENT DOCUMENTS

| | | |
|---|---|---|
| EP | 1 018 697 A | 7/2000 |
| EP | 1 139 301 A2 | 10/2001 |
| EP | 1 531 419 A2 | 5/2005 |
| GB | 2 331 613 A | 5/1999 |
| WO | WO 90/03620 A1 | 4/1990 |
| WO | WO 98/58342 A | 12/1998 |
| WO | WO 99/28701 A | 6/1999 |
| WO | WO 99/43258 A | 9/1999 |
| WO | WO 01/22349 A1 | 3/2001 |
| WO | WO 01/94902 A | 12/2001 |
| WO | WO 02/47018 A2 | 6/2002 |
| WO | WO 02/061668 A1 | 8/2002 |
| WO | WO 02/077907 A1 | 10/2002 |
| WO | WO 03/075210 A2 | 9/2003 |
| WO | WO 2004/066194 A1 | 8/2004 |
| WO | WO 2004/066693 A1 | 8/2004 |

OTHER PUBLICATIONS

Search Report Mailed Sep. 8, 2005 for International Application No. PCT/US2005/012792.

Search Report Mailed Dec. 12, 2005 for International Application No. PCT/US2005/013943.

Search Report Mailed Dec. 22, 2005 for European Application No. EP 05021634.0—2218.

Davide Maltoni, "*Handbook of Fingerprint Recognition*", XP002355942 Springer, New York, USA, Jun. 2003, pp. 65-69.

Vermesan et al., "*A 500-dpi AC Capacitive Hybrid Flip-Chip CMOS ASIC/Sensor Module for Fingerprint, Navigation, and Pointer Detection With On-Chip Data Processing*", IEEE Journal of Solid State Circuits, vol. 38, No. 12, Dec. 2003, pp. 2288-2294.

\* cited by examiner

FINGER POSITION SENSING METHODS AND APPARATUS

CROSS REFERENCE TO RELATED APPLICATION

This application claims the benefit of provisional application Ser. No. 60/563,139, filed Apr. 16, 2004, which is hereby incorporated by reference in its entirety.

FIELD OF THE INVENTION

This invention relates to systems and methods for electronically sensing biometric features of an object, such as a fingerprint. More particularly, the invention relates to methods and apparatus for sensing the position of a finger relative to a sensor. The invention is particularly useful to determine finger speed in a fingerprint sensing system wherein a finger is swiped over an image sensor.

BACKGROUND OF THE INVENTION

Electronic fingerprint sensing has received increased attention as a technique for reliable identification of individuals. Electronic fingerprint sensing may be used in stationary equipment, such as security checkpoints, and in portable devices, such as mobile phones and other wireless devices, and smart cards. Accordingly, electronically fingerprint sensing systems are required to be compact, highly reliable and low in cost.

Various electronic fingerprint sensing methods have been proposed. Known methods include optical sensing and capacitive sensing with a two-dimensional array of electrodes.

Capacitive fingerprint sensing using a swiped finger technique is disclosed in the International Publication No. WO 02/47018, published Jun. 13, 2002. Conductive elements, or plates, are formed on an insulating substrate to create a one-dimensional capacitive sensing array for detecting topographic variations in an object, such as a finger. The array includes multiple drive plates which are sequentially excited with short duration electronic waveform bursts. An orthogonal pickup plate connected to a charge sensing circuit sequentially detects the intensity of the electric field created by each drive element. With each complete scan of the drive plates, a one-dimensional slice of the fingerprint is acquired. By swiping a finger across the gap between the drive plates and the pickup plate, and scanning the gap at a much faster rate than the swipe speed, a two-dimensional image based on capacitance is generated. The image represents the fingerprint.

In order to combine the multiple one-dimensional image slices into a two-dimensional fingerprint image, finger swipe speed is required. The two-dimensional fingerprint image can be formed using the sensed swipe speed to control how the one-dimensional image slices are combined. Finger speed can be determined by sensing finger position at different times during a swipe over the image sensor. Various finger speed and finger position detectors have been proposed in the prior art. For example, U.S. Pat. No. 6,002,815, issued Dec. 14, 1999 to Immega et al., discloses a method and optical apparatus for capturing an image of a moving object using multiple linear arrays wherein the finger swipe speed is estimated from a set of arrival times for fingerprint minutia at successive arrays using template-matching correlation techniques. Prior art devices such as that mentioned above suffer from finger dependent correlation performance in the tracking algorithm. Furthermore, all optical techniques suffer from the ease at which they can be spoofed using relatively inexpensive artificial fingers and finger coverings.

Consequently, there is a need for improved finger position sensing apparatus and methods that provide consistently accurate finger position and speed measurements simultaneous with secondary biometric information to drastically reduce the probability of spoofing.

SUMMARY OF THE INVENTION

According to a first aspect of the invention, finger position sensing apparatus is provided. The apparatus comprises a position pickup plate disposed generally orthogonally with respect to an expected direction of movement of a finger, and a plurality of position drive plates having different spacings from the position pickup plate to define a plurality of position sensor gaps between respective position drive plates and the position pickup plate. The position drive plates are dimensioned and spaced from the position pickup plate to sense the bulk of a finger rather than fingerprint features.

According to a second aspect of the invention, a fingerprint sensing system is provided. The fingerprint sensing system comprises an image sensor to sense ridge peaks and ridge valleys of a fingerprint on a moving finger, a finger position sensor to sense positions of the finger as it moves across the image sensor, the position sensor comprising a position pickup plate disposed generally orthogonally with respect to an expected direction of movement of the finger and a plurality of position drive plates having different spacings from the position pickup plate to define a plurality of position sensor gaps between respective position drive plates and the position pickup plate, and a sensor circuit for excitation of the image sensor with image drive signals and for detection of image signals generated by the image sensor in response to the image drive signals, and for sequentially energizing the position drive plates with position drive signals and for detection of position signals generated by the position sensor in response to the position drive signals, wherein the image signals and the position signals represent a fingerprint image.

According to a third aspect of the invention, a method is provided for a finger position sensing. The method comprises providing a position sensor including a position pickup plate disposed generally orthogonally with respect to an expected direction of movement of a finger and a plurality of position drive plates having different spacings from the position pickup plate to define a plurality of position sensor gaps between respective position drive plates and the position pickup plate, sequentially energizing the position drive plates with position drive signals, detecting the position drive signals coupled from respective position drive plates to the position pickup plate to provide position signals, and analyzing the position signals to determine the position of the finger on the position sensor.

BRIEF DESCRIPTION OF THE DRAWINGS

For a better understanding of the present invention, reference is made to the accompanying drawings, which are incorporated herein by reference and in which.

DETAILED DESCRIPTION

In accordance with an aspect of the invention, conductive elements, or plates, are formed on an insulating substrate to create an array of two or more drive plates substantially parallel to the end of a moving finger and spaced apart in the path of motion of the finger. The drive plates operate in conjunction with a common pickup plate to detect the motion of a fingertip as it is swiped across the individual drive plates. In one embodiment, drive elements are sequentially energized for short durations with radio frequency (RF) bursts at a repetition rate much faster than the swipe speed. The action of transmitting these RF bursts into the bulk of the finger results in conduction of those signals through the finger to the pickup plate. There is a significant difference in the level of the signal detected at the pickup plate for drive plates that are in contact with the finger as compared with those that are not in contact with the finger, creating a windowshade-like profile of finger position each time the drive plates are scanned. A measurable difference in the level of signal detected within the group of drive plates contacting the finger can be exploited to provide secondary biometric information. The length of the array of drive plates is greater than the length of the portion of the finger to be scanned. Otherwise, the end of the finger at the farthest image point could not be detected.

The finger position sensing apparatus may further include an excitation circuit for sequentially energizing the drive plates with position drive signals and a detection circuit for detected the drive signals transmitted through the bulk of the finger from the drive plates to the pickup plate. The position drive signals may be sequential signal bursts supplied to respective ones of the position drive plates. The excitation circuit may include circuitry for coupling inactive position drive plates to a reference potential. The detection circuit may include a synchronous envelope detector for generating pulses in response to the detected signal bursts. The detection circuit may further include an analog-to-digital converter for converting the pulses to digital values, a memory and a processor for storing the digital values in the memory. The processor may initiate a plurality of sequential scans of the position drive plates to provide a plurality of position measurements to measure the speed of a moving finger. The processor may also control a plurality of sequential scans of the position drive plates in order to determine the amount of energy passing through the epidermis, dermis and hypodermis regions of the finger by scanning the drive plates at a rate much faster than the finger motion. The processor can be used to construct a speed profile of the finger motion with a resolution equal to the physical spacing between the plates.

According to another aspect of the invention, the position drive plate dimensions are selected such that the amount of signal injected into the bulk of the finger is not dependent on the number or orientation of finger ridges in contact with the drive plate. In order to guarantee sufficient signal injection in the worst case where the ridges are parallel to the drive plates, the drive plates must be wider than the largest ridge-to-valley spacing in the finger. Otherwise, there may be no contact between the finger and the drive plate. In another embodiment, the width of the drive plates may increase with distance from the pickup plate to inject additional signal, thereby compensating for conduction modes that attenuate in the bulk of the finger over distance. The variation in drive plate width can be made to compensate for selected conduction modes in order to facilitate secondary biometric measurement. In such an embodiment, a ground plane may be added to limit lateral parasitic conduction into the pickup plate when a finger is not present. This structure may be an array of interdigitated conductive plates that are connected to a fixed potential low-impedance plane and are spaced from adjacent drive plates by a gap much smaller than the width of the drive plates. A similar parasitic field suppression can be achieved by placing a fixed potential low-impedance plane directly beneath the drive plates and separated by a thin insulating layer.

In another embodiment, the pickup plate and detection circuit can be integrated with a single slice capacitive ridge image sensor. In this configuration, sequential signal bursts are supplied to the position drive plates before or after the image drive plates and are driven at a rate much faster than the finger motion. There is a significant difference in received signal level at the common pickup plate when the position drive plates are energized as compared with the image drive plates due to differences in the proximity of the drive plates. A programmable gain amplifier may be synchronized to toggle the position and image gain settings during the scanning process in order to normalize this difference in the signal level between the two modes, before the signals are supplied to the detector and the analog-to-digital converter circuitry.

Figure 1:
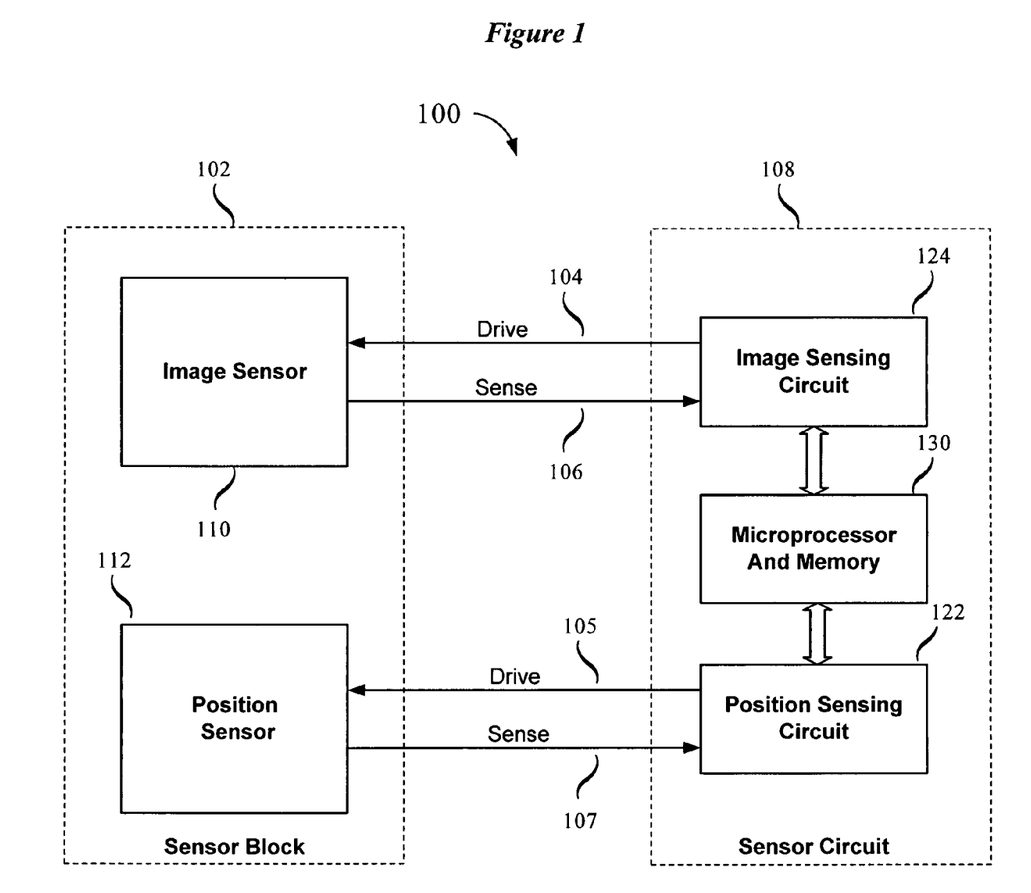
FIG. 1 is a block diagram of a fingerprint sensing system incorporating features of the present invention.

FIG. 1 shows a fingerprint sensing system 100 incorporating features of the present invention. A sensor block 102 receives drive signals from and delivers sense signals to a sensor circuit 108. Sensor block 102 includes an image sensor 110 and a position sensor 112. Image sensor 110 and position sensor 112 may be fabricated on a single substrate as described below. Sensor circuit 108 includes an image sensing circuit 124, a position sensing circuit 122 and a microprocessor and memory 130. Image sensor 110 receives drive signals 104 from and delivers sense signals 106 to image sensing circuit 124. Position sensor 112 receives drive signals 105 from and delivers sense signals 107 to position sensing circuit 122. Microprocessor and memory 130 acquires and processes image data and position data and controls operation of the system. The components of fingerprint sensing system 100 are described in detail below.

Figure 2:
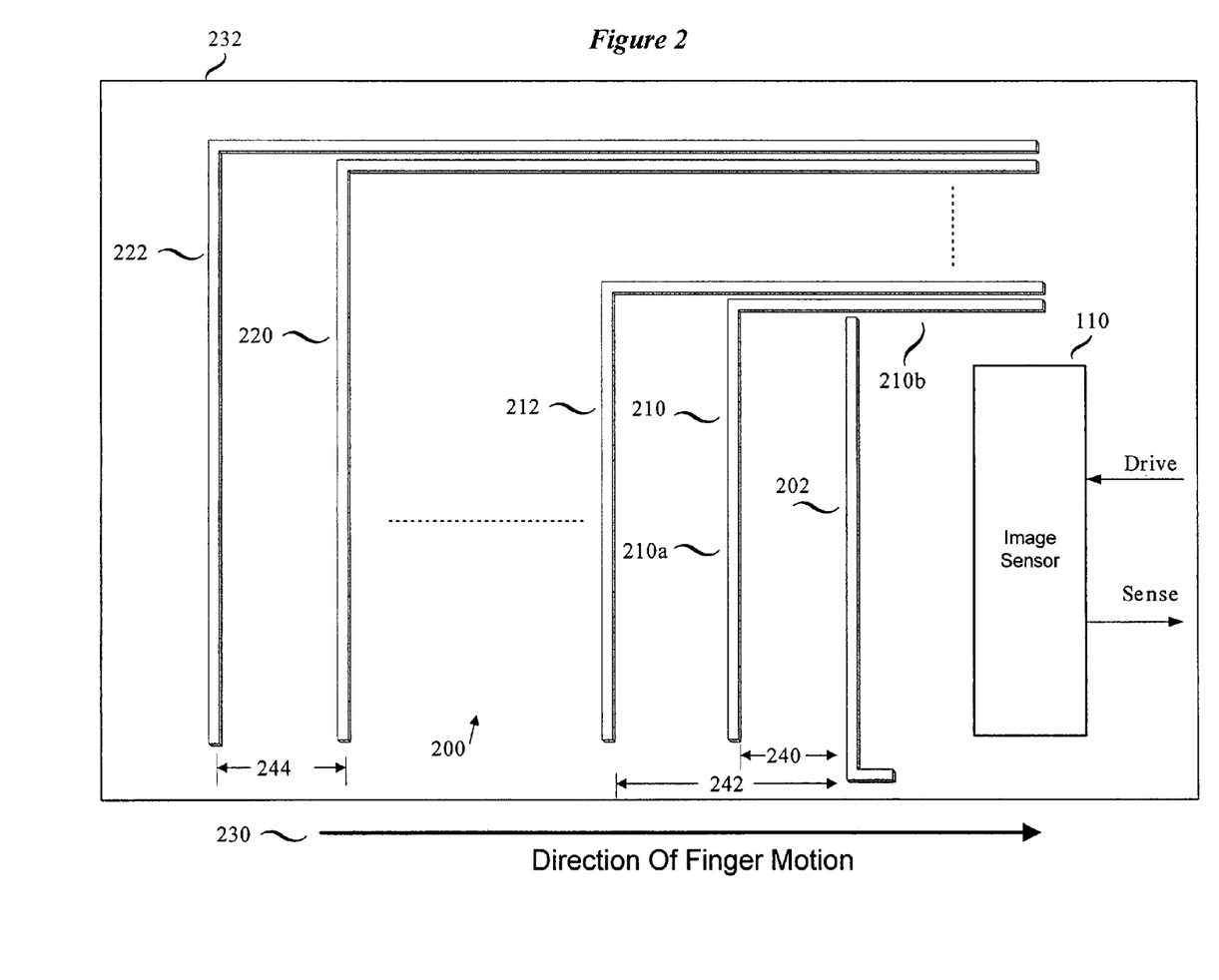
FIG. 2 shows a position sensor according to a first embodiment of the invention.

Sensor block 102 in accordance with a first embodiment of the present invention is shown in FIG. 2. Image sensor 110 may be configured as shown and described in the aforementioned International Publication No. WO 02/47018, which is hereby incorporated by reference. The disclosed image sensor includes an image pickup plates disposed generally orthogonally with respect to an expected direction of movement of the finger, and a plurality of image drive plates in spaced relation to the image pickup plate define a plurality of sensor gaps between respective image drive plates and the image pickup plate. Ridge peaks and ridge valleys of the fingerprint passing over the sensor gaps produce a change in capacitance between respective image drive plates and the image pickup plate. It will be understood that different image sensors may be utilized within the scope of the present invention.

In the embodiment of FIG. 2, a finger position sensor 200 includes a position pickup plate 202 and multiple position drive plates 210, 212, . . . 220, and 222. An expected direction of finger motion across sensor block 102 is indicated by arrow 230. Pickup plate 202 and drive plates 210, 212, . . . 220, and 222 may be conductive traces on a substrate 232. In the one embodiment, a sensing portion 202a of pickup plate 202 is a straight conductor that is disposed generally orthogonally with respect to the expected direction of finger motion indicated by arrow 230. In addition, drive plates 210, 212, . . . 220, and 222 may include sensing portions (such as sensing portion 210a) that are straight conductors disposed generally orthogonally with respect to the expected direction of finger motion. Accordingly, the sensing portions of pickup plate 202 and drive plates 210, 212, . . . 220, and 222 may be parallel and may be disposed generally orthogonally with respect to the expected direction of finger motion. The pickup plate and the drive plates may also include connecting portions (such as connecting portion 210b) that interconnect the sensing portions to sensor circuit 108 as shown in FIG. 1.

The drive plates 210, 212, . . . 220, and 222 are spaced from pickup plate 202 by progressively increasing distances. Thus, for example, drive plate 210 is spaced from pickup plate 202 by a distance 240, drive plate 212 is spaced from pickup plate 202 by a greater distance 242, etc. Adjacent drive plates may be equally spaced by a distance 244. However, equal spacing between adjacent drive plates is not required. The drive plates 210, 212, . . . 220, and 222 are dimensioned and spaced from pickup plate 202 to sense the bulk of a finger rather than fingerprint features. Thus, the spacing between each drive plate and the pickup plate may be greater than about two times the typical spacing between ridge peaks and ridge valleys of a fingerprint. Using this approach, a center-to-center spacing between closest drive plate 210 and pickup plate 202 is about 0.025 inch or greater, and a center-to-center spacing between adjacent drive plates may have a similar value.

Pickup plate 202 and drive plates 210, 212, . . . 220, and 222 may be any suitable conductive elements for coupling signal bursts to and from the finger. The drive plates and the pickup plates may be straight conductive elements or suitably curved conductive elements. In some embodiments, the pickup plate and the drive plates are substantially coplanar conductive traces on a substrate. The substrate may be any suitable insulating material. In some embodiments, the substrate may be flexible so that it conforms to the macro contours of the finger. However, a flat substrate may be utilized without impairing the performance of the position sensor. The substrate may be a rigid or flexible printed circuit board, and the drive plates and the pickup plate may be formed using conventional deposition, etching and photolithography techniques.

In one example, the sensing portions of pickup plate 202 and drive plates 210, 212, . . . 220, and 222 have lengths of 0.5 inch and a center-to-center spacing between adjacent sensing portions of 0.027 inch. The finger position sensor may include 25 to 35 drive plates, but is not limited to this number of drive plates. It will be understood that these values are given by way of example only and are not limiting as to the scope of the present invention.

In operation, drive plates 210, 212, . . . 220, and 222 are energized sequentially with signal bursts supplied by position sensing circuit 122 (FIG. 1). The signal bursts are coupled to pickup plate 202 and are detected by position sensing circuit 122. In the case where a finger is in contact or near contact with the energized drive plate and the pickup plate, the signal burst is conducted through the bulk of the finger to the pickup plate. More particularly, the signal burst is conducted through both the epidermis and dermis layers and into the subcutaneous (or hypodermis) layer of the finger, and then to pickup plate 202. In the case where the finger is not in contact with the energized drive plate, the signal burst is conducted through air to the pickup plate, and a much smaller signal is detected. Thus, the sensed signal level indicates whether the finger is in contact with the energized drive plate and the pickup plate. By analyzing the detected signals from all of the drive plates, the position of the finger end can be determined. The finger may contact more than one of the drive plates at a given time. However, the last drive plate in contact with the finger indicates the position of the finger end.

Figure 3:
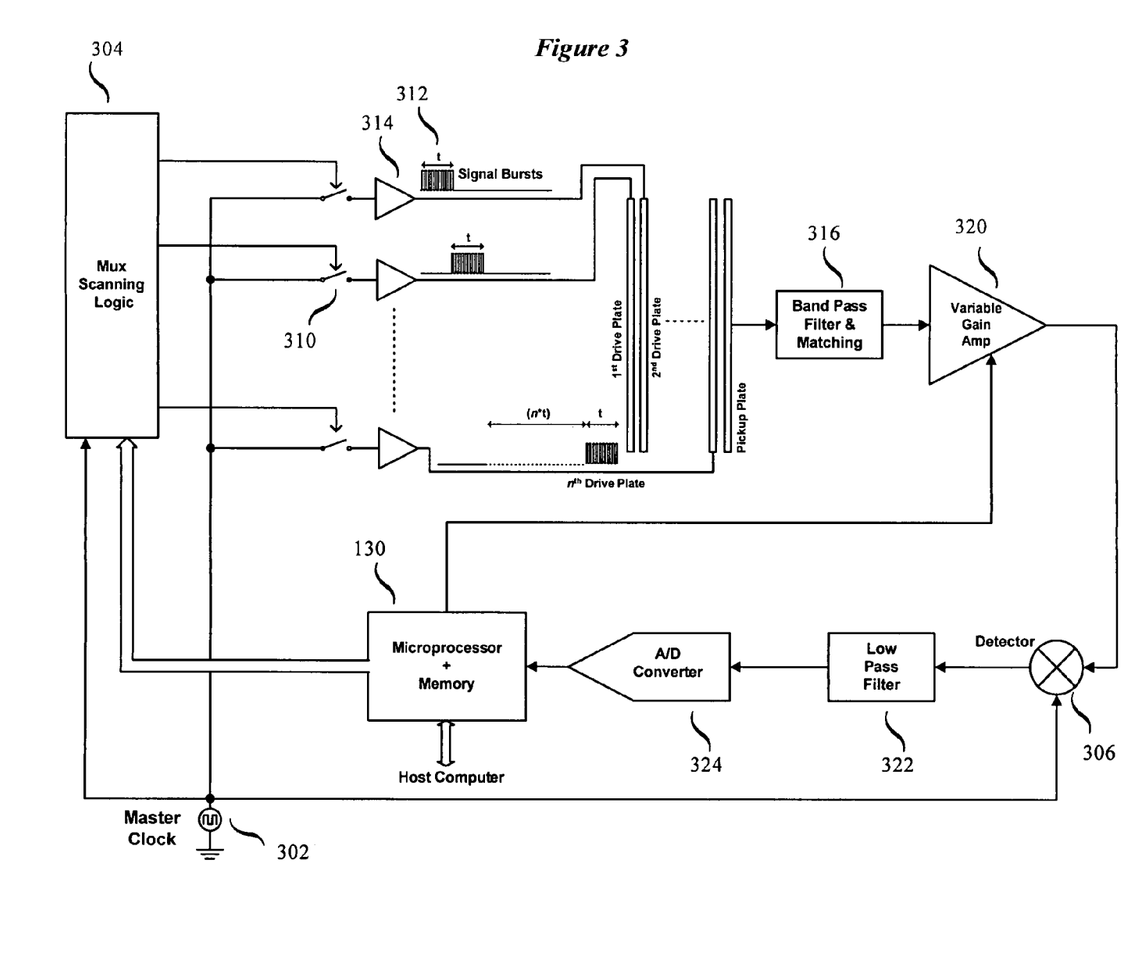
FIG. 3 is a block diagram of a position sensing circuit according to a second embodiment of the invention.

Sensor circuit 108 in accordance with a second embodiment of the invention is shown in FIG. 3. Position sensing circuit 122 and microprocessor and memory 130 of FIG. 1 are shown in FIG. 3. A master clock 302 provides a clock signal to mux scanning logic 304 and a detector 306. Master clock 302 can operate over a range of frequencies, for example, 20-80 MHz, but is not limited to this range. Microprocessor and memory 130 generates control signals for mux scanning logic 304. Outputs of mux scanning logic 304 serve as control inputs to switches 310.

The clock signal from master clock 302 is gated by switches 310 to provide signal bursts. A low impedance buffer 314 activates each drive plate 210, 212, . . . 220, and 222 with a signal burst 312. Signal bursts 312 are generated by standard circuit elements known to those skilled in the art and are derived from a common reference frequency or master clock 302.

Mux scanning logic 304 may sequentially activate switches 310 to 20 scan the position drive plates. In one embodiment, master clock 302 operates at 40 MHz, and each switch 310 is gated on for about 2-5 microseconds. The sequential signal bursts 312 applied to the drive plates provide a scan of the finger position sensor. Because the scan speed is large in comparison with the finger swipe speed, multiple finger position measurements can be acquired. Since the finger position is known at different times during the swipe, swipe speed can be determined.

One of skill in the art will appreciate that the drive plates of position sensor 200 need not be energized sequentially. In fact, the drive plates may be energized in any order. Further, the drive plates need not be energized with bursts of master clock 302, but may be energized by any periodic signal, such as a sinewave.

When its control input is activated, each switch 310 supplies a signal burst from master clock 302 to buffer 314. Signal burst 312 output by buffer 314 is coupled from one of the drive plates 210, 212, . . . 220, and 222 to pickup plate 202. The signal is coupled either through air or through a finger. The coupled signal is a function of the presence or absence of a finger in contact with the energized drive plate and the pickup plate. When the control input to switch 310 is not activated, buffer 314 drives its connected drive plate to ground. Any parasitic fields between the energized drive plate and the non-energized drive plates are therefore shorted to ground. Pickup plate 202 detects the signal bursts and provides the coupled signals to a bandpass filter 316.

Bandpass filter 316 may be centered at the frequency of master clock 302 and may have a Q of 10. The output from bandpass filter 316 is supplied to a variable gain amplifier 320. The gain of variable gain amplifier 320 may be controlled by microprocessor and memory 130. The gain may be adjusted to provide a desired output level despite variable sensing conditions.

The output of variable gain amplifier 320 is multiplied in detector 306 by the clock signal from master clock 302. Detector 306 performs synchronous envelope detection of signal bursts 312. The output of detector 306 is a baseband pulse that represents the envelope of the coupled signal burst. In an alternative embodiment, synchronous rectification may be used for envelope extraction. The amplitude of the pulse output by detector 306 is a function of the signal coupled from the drive plate through the finger or air to the pickup plate. The pulse amplitude modulated signal is supplied to a low pass filter 322. Low pass filter 322 removes unwanted high frequency harmonics produced by the detection process. Low pass filter 322 may have group delay characteristics that compensate for phase distortions that occurred in the previous signal processing stages. Low pass filter 322 may be optimized for processing the information coming out of the detector 306 at the rate at which the drive plates are scanned.

An analog-to-digital converter 324 converts the output of low pass filter 322 to a digital value. Analog-to-digital converter 324, for example, may have a resolution of 8-12 bits and is therefore capable of resolving the output of low pass filter 322 into 256 to 4096 values in this example. Analog-to-digital converter 324 operates at a sufficient speed (e.g. 2 kilosamples/sec) to accommodate the scanning of finger position sensor 200. Microprocessor and memory 130 receives the output of analog-to-digital converter 324 and stores it in a buffer. Each stored digital value represents the coupled signal between a drive plate and the pickup plate 202 when the drive plate was energized by signal burst 312.

Figure 4:
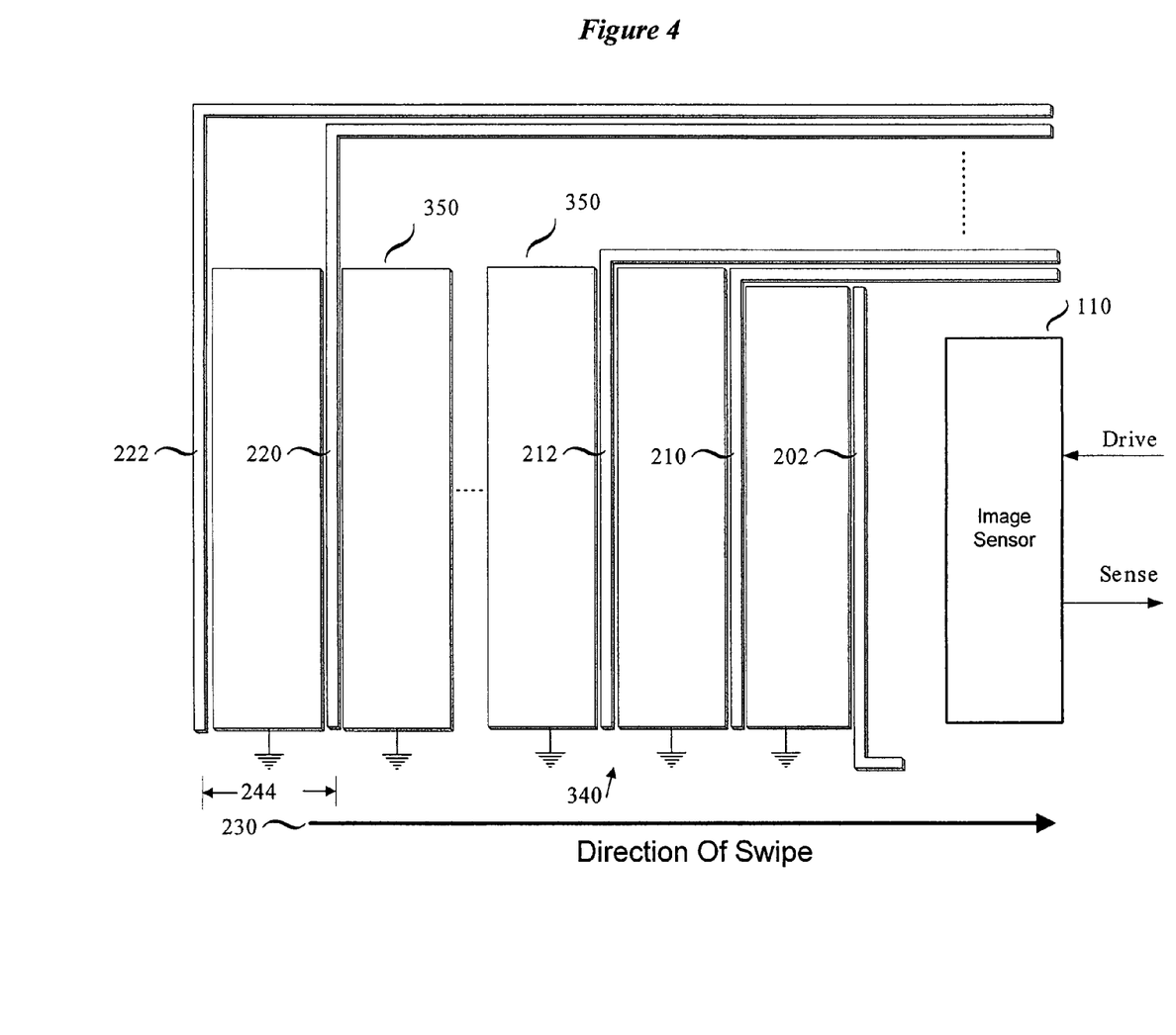
FIG. 4 shows a position sensor according to a third embodiment of the invention.

A finger position sensor in accordance with a third embodiment of the present invention is shown in FIG. 4. A finger position sensor 340 includes pickup plate 202 and drive plates 210, 212, ... 220, and 222 as described above. In the embodiment of FIG. 4, ground plates 350 are positioned between adjacent drive plates and between drive plate 210 and pickup plate 202. Each of the ground plates 350 may be connected to ground or to another reference potential. Ground plates 350 are preferably spaced from the drive plates by a relatively small spacing 352 such as 0.004 inch. Ground plates 350 suppress parasitic electric fields at and near the surface of the position sensor. As a result, parasitic coupling between the drive plate and the pickup plate is limited, and coupling through the finger is enhanced.

Figure 5:
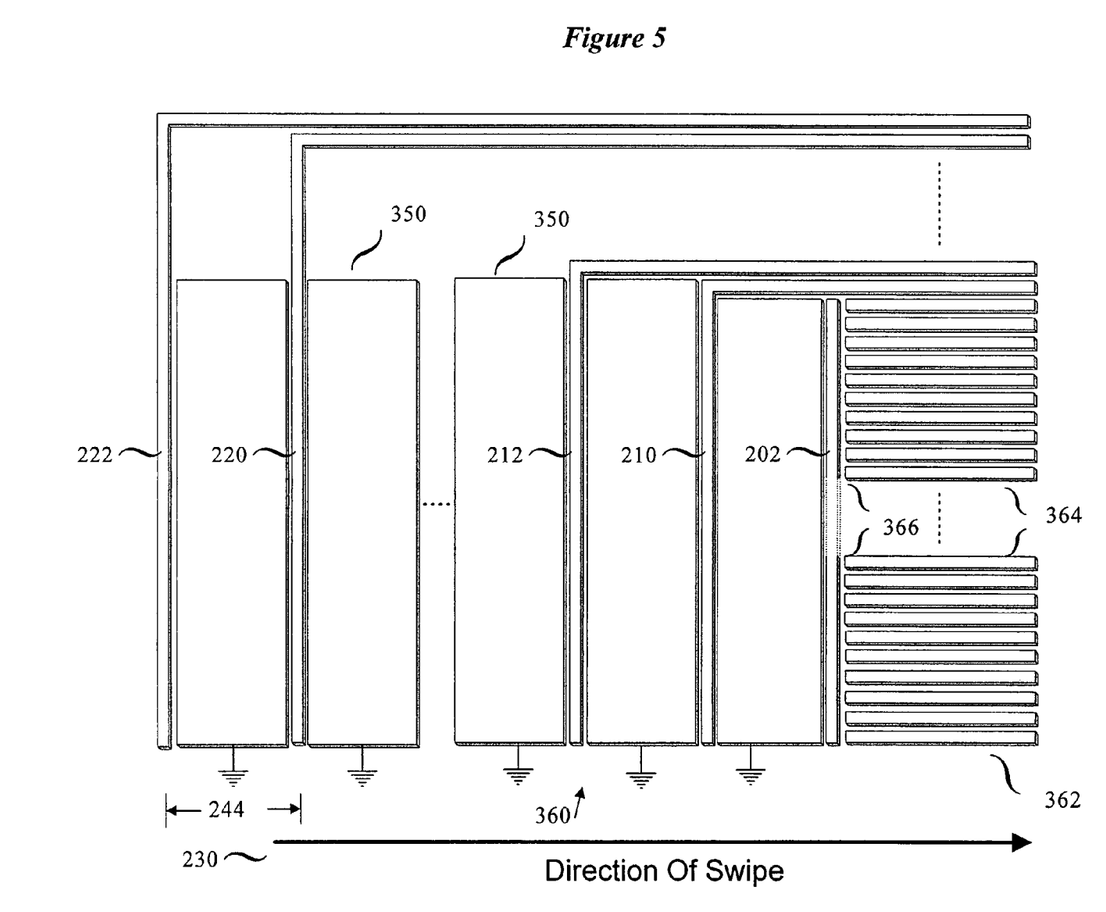
FIG. 5 shows a position sensor according to a fourth embodiment of the invention.

A finger position sensor in accordance with a fourth embodiment of the invention is shown in FIG. 5. A finger position sensor 360 includes pickup plate 202, drive plates 210, 212, ... 220, and 222, and ground plates 350 as described above. In the embodiment of FIG. 5, position sensor 360 and an image sensor 362 utilize a common pickup plate 202. Image sensor 362 includes multiple image drive plates 364 and common pickup plate 202. Image drive plates 364 are arranged substantially parallel to each other and are connected to sensor circuit 108. Pickup plate 202 may be disposed substantially perpendicular to image drive plates 364. Image drive plates 364 are separated from pickup plate 202 by image sensor gaps 366. Thus, image sensor 362 includes multiple sensor gaps 366 between respective image drive plates 364 and common pickup plate 202. In this embodiment, image sensor 362 includes a linear array of sensor gaps. Additional details regarding the image sensor are disclosed in the aforementioned International Publication No. WO 02/47018.

In operation, position sensor 360 and image sensor 362 may be energized in an alternating manner to acquire slices of a fingerprint image and finger position information. In particular, image drive plates 364 may be energized sequentially to acquire a slice of a fingerprint image. Then, position drive plates 210, 212, ... 220, and 222 are energized sequentially to acquire a finger position measurement. The values are stored and the process is repeated multiple times to acquire multiple slices of a fingerprint image and multiple finger position measurements. The stored values are processed to generate a two-dimensional fingerprint image.

Figure 6:
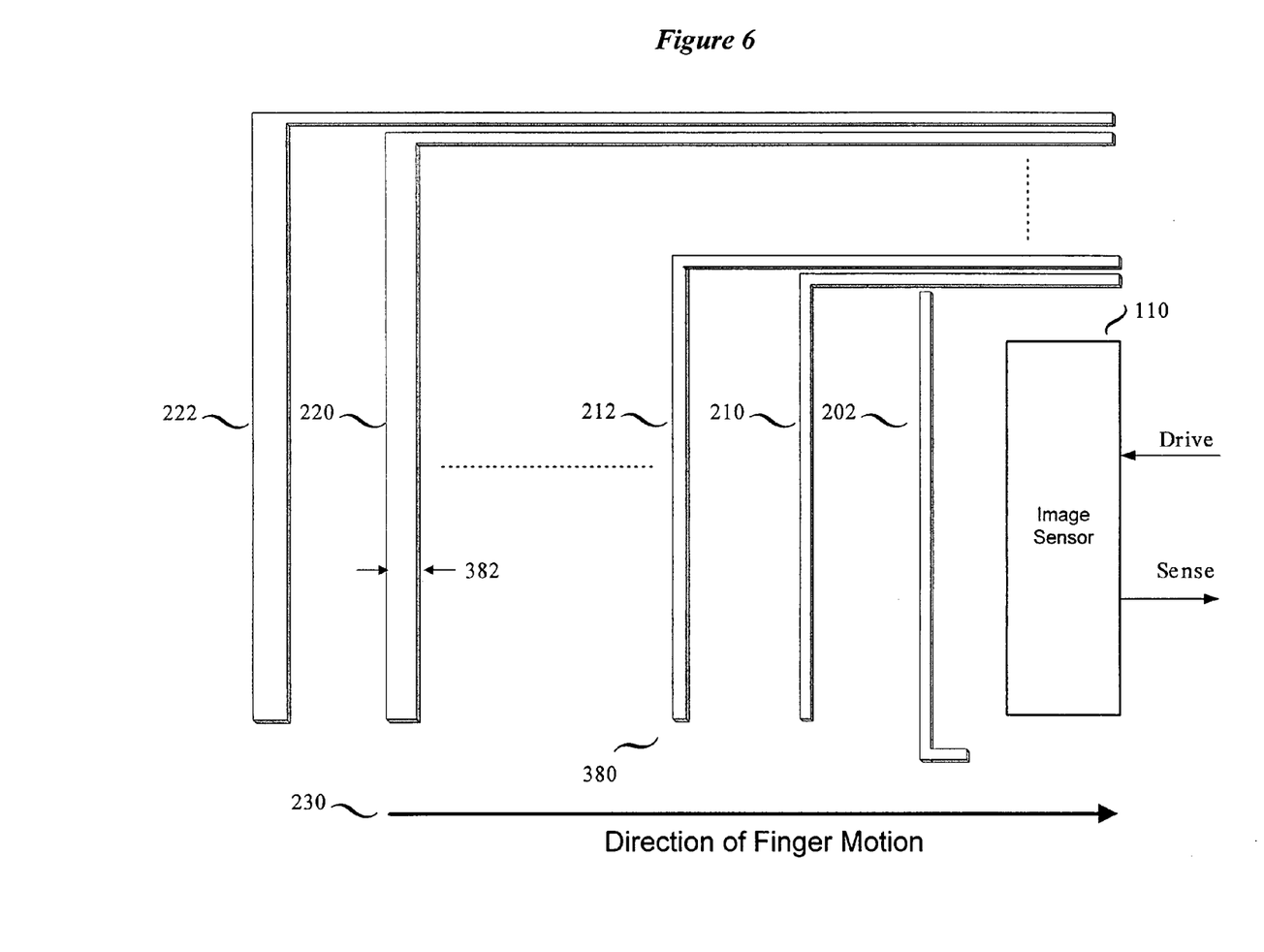
FIG. 6 shows a position sensor according to a fifth embodiment of the invention.

A finger position sensor in accordance with a fifth embodiment of the invention is shown in FIG. 6. A finger position sensor 380 includes pickup plate 202 and drive plates 210, 212, ... 220, and 222 as described above, except that the drive plates have different widths. In the embodiment of FIG. 6, a width 382 of a sensing portion of drive plates 210, 212, ... 220 and 222 increases with distance from position pickup plate 202. The increased widths of the position drive plates compensates, at least in part, for the reduced signal coupling from drive plates that are more distant from pickup plate 202. In one example, the width of the drive plates increases from 0.008 inch closest to pickup plate 202 to 0.015 inch farthest from pickup plate 202.

Figure 7:
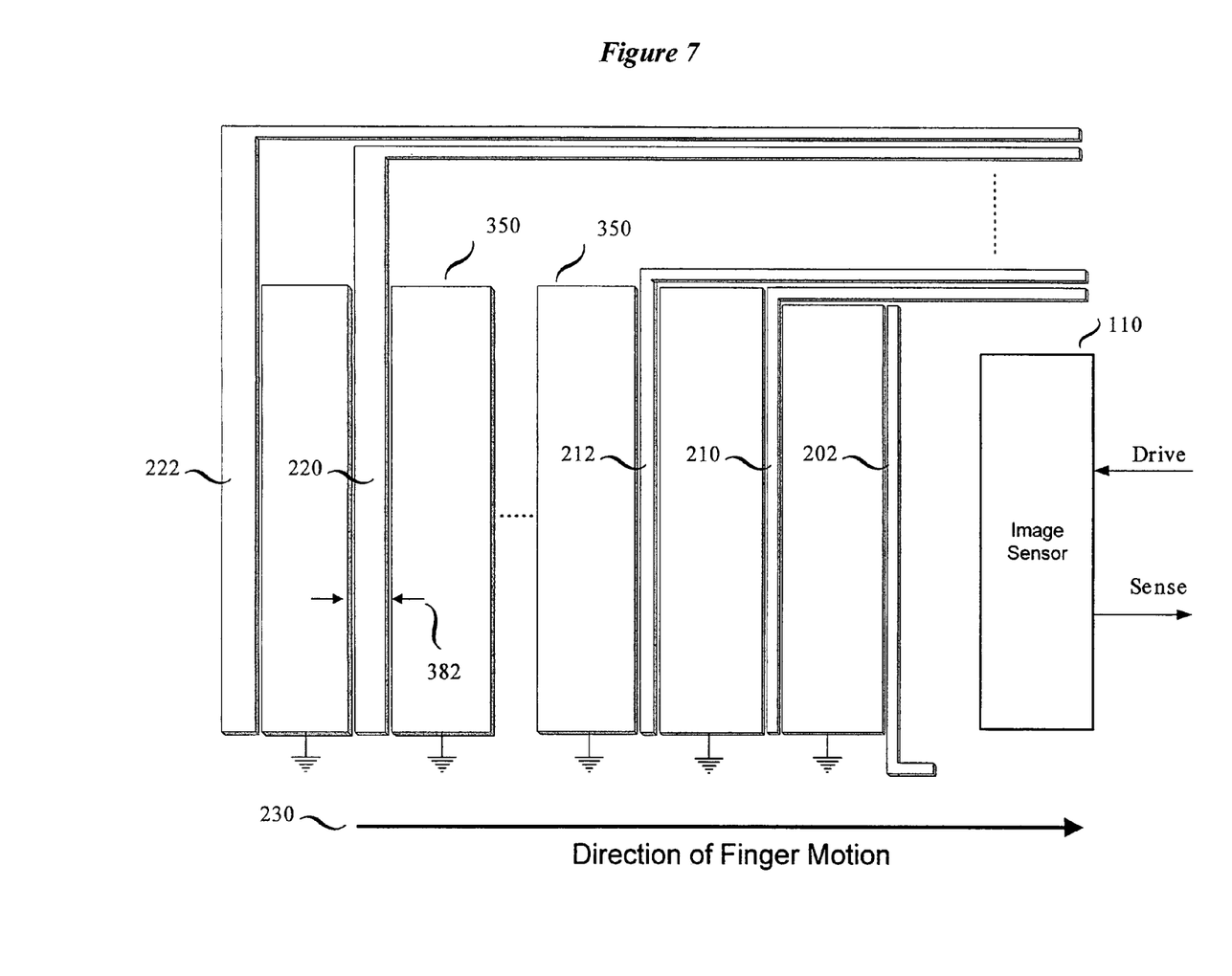
FIG. 7 shows a position sensor according to a sixth embodiment of the invention.
Figure 8:
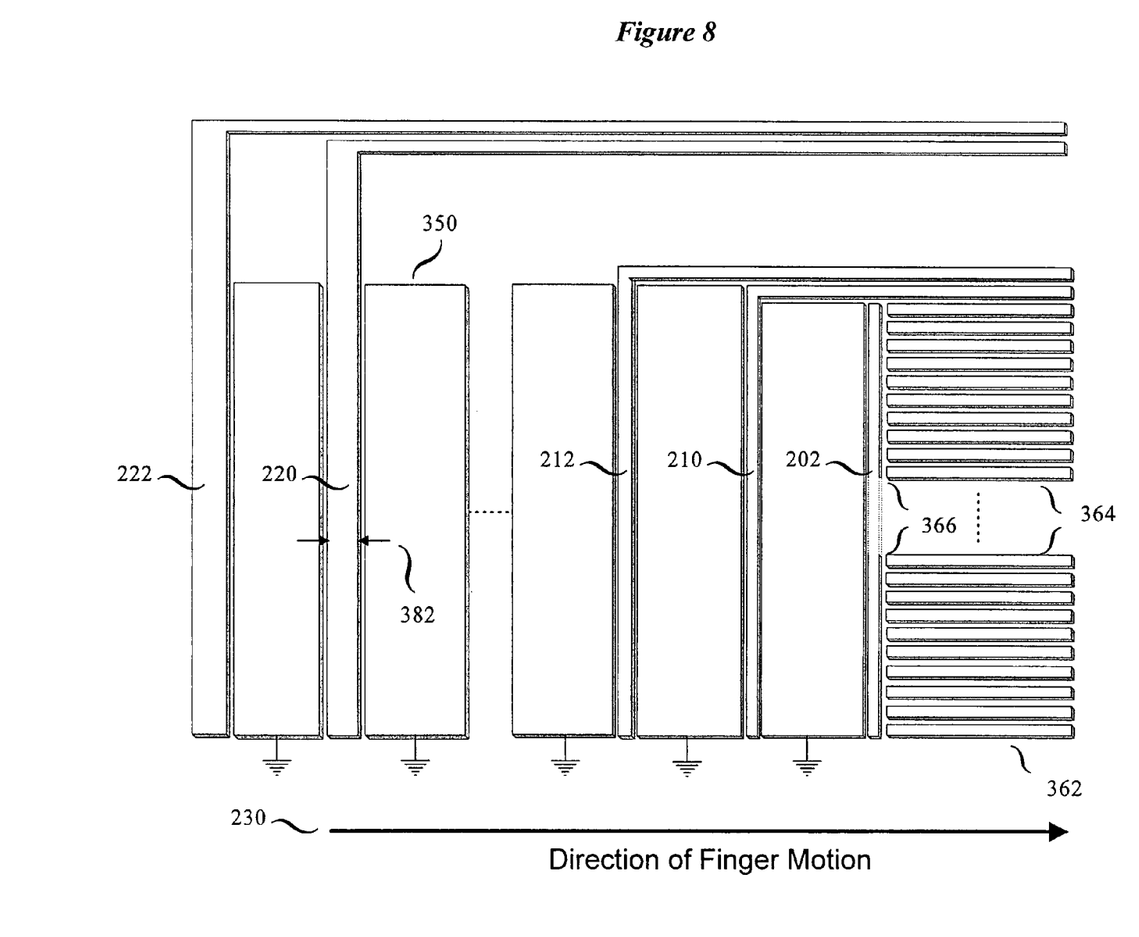
FIG. 8 shows a position sensor according to a seventh embodiment of the invention.

A finger position sensor in accordance with a sixth embodiment of the invention is shown in FIG. 7. A finger position sensor 400 includes pickup plate 202 and drive plates 210, 212, ... 220, and 222 as described above. In the embodiment of FIG. 7, ground plates 350 are positioned between adjacent position drive plates 210, 212, ... 220 and 222. In addition, the drive plates have widths 382 that increase with distance from pickup plate 202. A finger position sensor in accordance with a seventh embodiment of the invention is shown in FIG. 8. A finger position sensor 410 includes pickup plate 202 and drive plates 210, 212, ... 220, and 222 as described above. The embodiment of FIG. 8 includes ground plates 350 between adjacent position drive plates. In addition, the drive plates have widths 382 that increase with distance from pickup plate 202. Furthermore, position sensor 410 is integrated with image sensor 362 having image drive plates 364. Position sensor 410 and image sensor 362 utilize common pickup plate 202 in the embodiment of FIG. 8.

The signals acquired during finger position sensing may be stored to form a secondary biometric measurement (the fingerprint being the primary biometric measurement). The conduction mode signature through the finger varies from individual to individual and may be used as a secondary identification of the individual. The measured conduction signature may be compared with a stored conduction signature. This approach may be useful, for example, in identifying "fake" fingers made of rubber or other material.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for finger position sensing comprising:
providing a position sensor including a position pickup plate disposed generally orthogonally with respect to an expected direction of movement of a finger and a plurality of position drive plates having different spacings from said position pickup plate to define a plurality of position sensor gaps between respective position drive plates and said position pickup plate;
sequentially energizing the position drive plates with position drive signals;
detecting the position drive signals coupled from respective position drive plates to the position pickup plate to provide position signals; and
analyzing the position signals to determine the position of the finger on the position sensor, wherein analyzing includes calculating additional biometric information from a conduction mode signature of the bulk of the finger, when radio frequency bursts are transmitted into the finger, to improve anti-spoofing capabilities.

* * * * *